United States Patent [19]

Campbell

[11] Patent Number: 5,022,560
[45] Date of Patent: Jun. 11, 1991

[54] SPIGOT AND WRENCH COMBINATION FOR A BEVERAGE DISPENSER

[76] Inventor: William P. Campbell, 2103 Bayside Dr., Corona del Mar, Calif. 92625

[21] Appl. No.: 363,702

[22] Filed: Jun. 9, 1989

[51] Int. Cl.⁵ .............................................. B67D 5/60
[52] U.S. Cl. ...................................... 222/131; 285/39
[58] Field of Search ................ 222/91, 183, 464, 131; 137/327; 285/38, 39, 161

[56] References Cited

U.S. PATENT DOCUMENTS

| | | | |
|---|---|---|---|
| 942,541 | 12/1909 | Carlson | 137/327 |
| 1,898,617 | 2/1933 | Church | 285/39 |
| 2,286,263 | 6/1942 | Comins | 285/38 X |
| 2,926,701 | 3/1960 | Campbell | 285/39 X |
| 3,333,737 | 8/1967 | Molineux | 222/91 |
| 3,527,478 | 9/1970 | Enssle | 285/38 |

FOREIGN PATENT DOCUMENTS 763643  9/1980  U.S.S.R. ............................... 285/39

Primary Examiner—Michael S. Huppert
Assistant Examiner—Gregory L. Huson
Attorney, Agent, or Firm—George F. Bethel; Patience K. Bethel

[57] ABSTRACT

A beverage container having a spigot with a faucet for dispensing beverages. The spigot is removably secured within the walls of the beverage container by a hex nut having exterior protuberances or nibs. The faucet is removably secured to the spigot outside of the beverage container by a winged connector backed by a spring clip for removably securing the spigot to the faucet. The winged connector is used as a key for engaging the nibs or protuberances of the securement nut for causing it to turn and be tightened or loosened from the threads of the spigot, thereby allowing the removal of the spigot from the beverage container.

22 Claims, 2 Drawing Sheets

SPIGOT AND WRENCH COMBINATION FOR A BEVERAGE DISPENSER

BACKGROUND OF THE INVENTION

1. Field of the Invention

The field of this invention lies within the liquid dispensing art. More particularly, it lies within the field of beverage dispensing from a beverage container through a faucet. The faucet is removably mounted to the beverage container on a spigot to allow for flow of liquid or the beverage from the container through the faucet.

2. The Prior Art

The prior art with regard to liquid dispensers and more particularly, beverage dispensers, incorporated a spigot. The spigot was usually mounted to a lock nut configuration along with other means to hold it to a faucet.

The spigot was caused to be mounted and passed through the walls of a beverage container. The beverage container could be formed of various materials. Oftentimes, the beverage container was formed from rotationally molded high density polyethylene (HDP). The beverage container could also be formed from blow molded or injection molded materials or for that matter, a metal container, such as well known coffee dispensers of the prior art.

Oftentimes, when beverage dispensers are used in a commercial environment, they must be cleaned. In order to clean the beverage dispensers it was oftentimes necessary to clean and wash the entire dispenser, including the faucet, spigot and other means for extracting the beverage from the container.

In order to wash the beverage container and clean it, it was necessary to disassemble the faucet and spigot and remove them from the container. After the faucet and spigot were removed from the container, they were then cleaned in a suitable manner such as by hand or through a dishwasher. The opening to the beverage dispenser was also cleaned, including the interior thereof.

In order to take the spigot and the faucet apart, it was necessary to use a particular wrench. This is due to the fact that the securement means of the spigot passing through the side wall of the container did not lend itself to rotationally unthreading the spigot from the faucet. In order to do this, it was necessary to have a hex nut or other means turned by means of a wrench in order to loosen the entire spigot and faucet combination.

When looking more particularly at the prior art, it can be seen that a hex nut or other nut was generally incorporated on the outside wall of the beverage container. The hex nut was threaded over the spigot which passed through the beverage container walls which seated it tightly within the beverage container walls. Attached to the spigot on the outside of the beverage container was a faucet with a winged securement connector which connected the spigot to the faucet. This was easily enough maintained but in order to withdraw the faucet from the spigot, it was necessary to unthread the hex or other securement nut of the spigot by means of a wrench.

This invention overcomes the foregoing deficiency by providing an integral unthreading means by means of a novel winged connector in combination with a novel securement nut. The winged connector in this particular instance is allowed to be used as a wrench or key in turning the hex or other securement nut attached to the spigot and thereby loosening or tightening it. After complete unthreading, the spigot can be removed from the container. The separate parts of the assembly can then be cleaned. Consequently, this invention stands as a significant advance over the prior art by providing a disassembly and removal of a spigot and faucet from a beverage container without any means of external tools or wrenches in order to disassemble and clean a beverage container and the dispensing means.

SUMMARY OF THE INVENTION

Summarily stated, this invention comprises a novel beverage dispenser including a faucet and spigot. The faucet which is removably attached to the spigot can be disassembled without special tools. The spigot hex nut is provided with protuberances which are engaged by the wings of a winged connector which interconnects the spigot to the faucet. When the winged connector is turned, the wings engage the protuberances of the spigot hex nut allowing the spigot hex nut to be dislodged from the spigot.

More particularly, the invention involves a beverage dispenser. The beverage dispenser has a spigot extending through the walls of the beverage dispenser and is removably attached to a faucet.

In order to secure the spigot to the beverage dispenser body, a hex nut or other securement nut is utilized on the external threaded end of the spigot which passes through the walls of the beverage dispenser. This nut is turned down on the spigot threads in order to secure it within the side walls of the beverage dispenser.

The hex nut or other securement nut is provided with a plurality of protuberances which are spaced radially around one side of the securement nut. These protuberances can be engaged by means of the wings of a winged connector. More particularly, the winged connector is used for connecting the faucet to the spigot by turning down in an exteriorly threaded male member of the faucet. In doing so, the connector secures the spigot to the faucet and can be turned away from it. After turning the connector away from the faucet and disconnecting it, the wings thereof can then be utilized in the manner of a key to engage the protuberances of the hex or other securement nut and turn it so that the hex nut thereby disengages itself from the threaded end of the spigot. In the alternative, the hex nut can be tightened following the same procedure.

In the foregoing manner, the invention allows the facile removal of the spigot and faucet for thorough cleaning of the interior and the other components of the entire beverage dispenser.

BRIEF DESCRIPTION OF THE DRAWINGS

The invention will be more clearly understood by reference to the description below taken in conjunction with the accompanying drawings wherein.

DETAILED DESCRIPTION OF THE PREFERRED EMBODIMENTS

Figure 1:
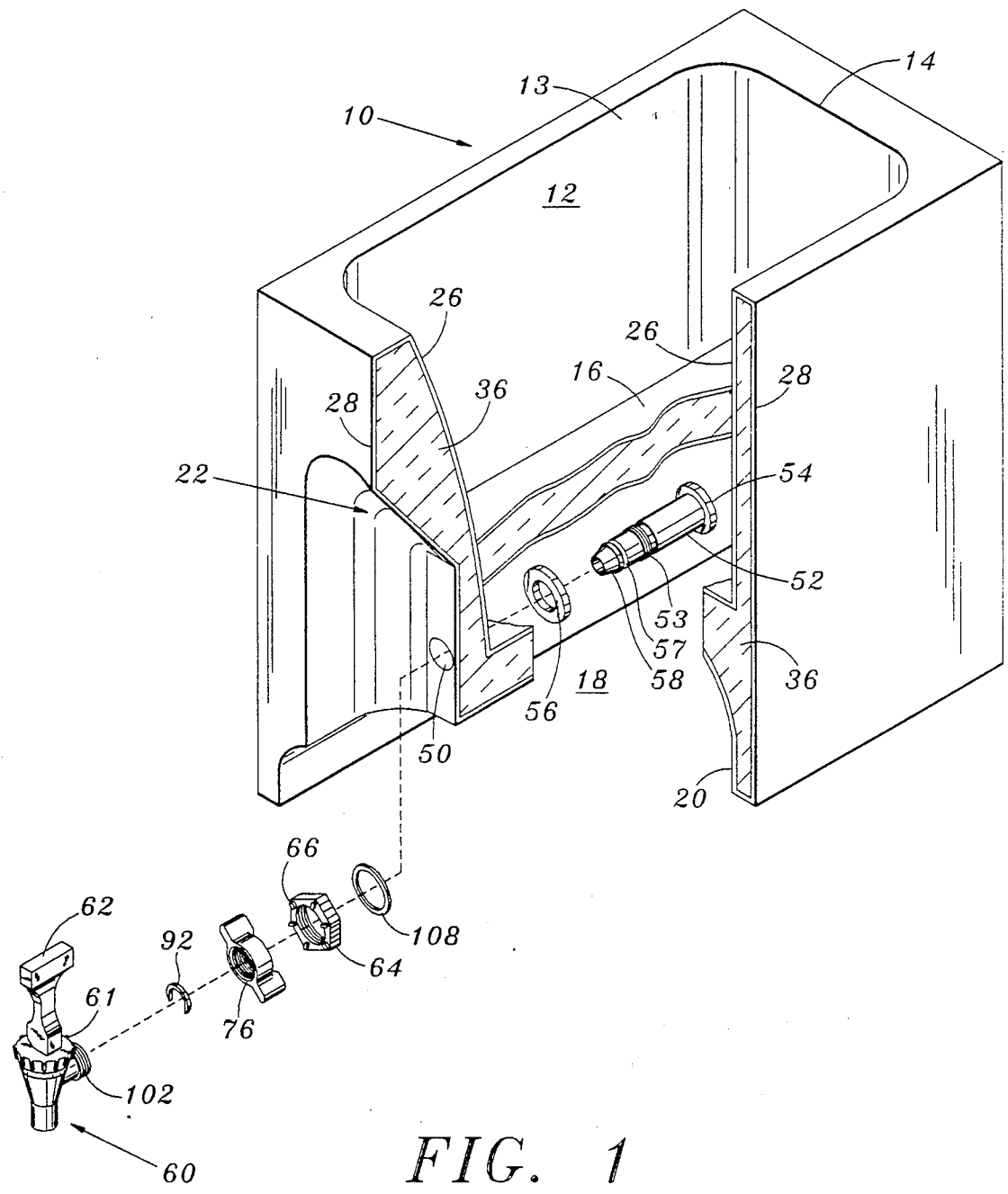
FIG. 1 shows a beverage dispenser that has been sectioned in part with the component parts of a spigot and faucet in disassembled exploded relationship.

Looking more particularly at FIG. 1, it can be seen that a beverage dispenser 10 has been shown. The beverage dispenser 10 has an open chamber 12 therein for the receipt of beverages. The open chamber or cavity 12 is generally covered by means of a cover not shown for the top opening 13. The cover over the top opening 13 of the chamber 12 can be secured by frictional engagement within the edge 14 of the top as shown. It can also be affixed by means of snap buckle securement tightening a cover into the edges 14 of the beverage dispenser 10.

The beverage dispenser 10 with its chamber 12 has a bottom wall 16. The bottom wall 16 serves as a diving wall between the chamber 12 and an interior bottom void 18. The interior bottom void 18 has curved walls 20 surrounding it for purposes of strength.

The outer walls of the beverage dispenser 10 are provided with an inset 22. The inset 22 or depression allows for a spigot 52 to be mounted therein for freedom of access and flow when a faucet 60 is attached to the end of a spigot 52 within the inset or depression 22.

The beverage dispenser container 10 is formed by rotational molding. The rotational molding provides the inner wall 26 and outer wall 28. The inner wall 26 and outer wall 28 form the beverage dispenser 10 in a manner such that there is a space between the walls 26 and 28. These walls can be rotationally molded of high density polyethylene (HDP). However, other methods such as blow molding or injection molding can be utilized. However, it has been found that injection molding is less economical than rotational molding.

In addition to the foregoing walls 26 and 28 forming the beverage dispenser body 10, the beverage container can be formed of metal sheet or other means to provide the interior chamber 12 for receipt of the beverage. The beverage receipt cavity 12 when formed in a sheet metal container such as a stainless steel coffee or tea dispenser or beverage dispenser or another configuration, can be formed by drawing, stamping and attendant welding or forming in securement or by any other means. In this particular case, the economics are such wherein the rotationally molded high density polyethylene container is a preferred embodiment for most applications.

The rotationally molded high density polyethylene forming the walls 26 and 28 are such wherein insulation and prevention of collapse or bulging is desirable. In order to effectuate this, polyurethane foam such as the foam 36 is expanded in the space between the walls 26 and 28. The polyurethane foam 36 is expanded while the container is held on a fixture. This prevents the container from bulging due to the expansion of the polyurethane foam.

Once the polyurethane foam 36 has been cured and does not expand beyond a certain amount, the container can be removed from the fixture and utilized thereafter. At this point, the polyurethane foam 36 helps to provide rigidity to the entire structure, namely the ability of the walls 26 and 28 to prevent buckling and undue expansion and contraction. Additionally, the foam 36 provides the needed function of an insulator. Since the beverage container 12 oftentimes receives beverages above or below ambient temperatures such as hot coffee or cooled beverages like iced tea, it is desirable for the walls to have an insulating effect. Insulation of the beverage container is enhanced by the nature of the polyurethane foam to provide insulation.

The ability to withdraw beverages from within the beverage chamber 12 is provided by means of an opening 50 in the walls 26 and 28 of the container. The opening 50 has a relatively close tolerance for receipt of a spigot 52 passing therethrough.

Figure 2:
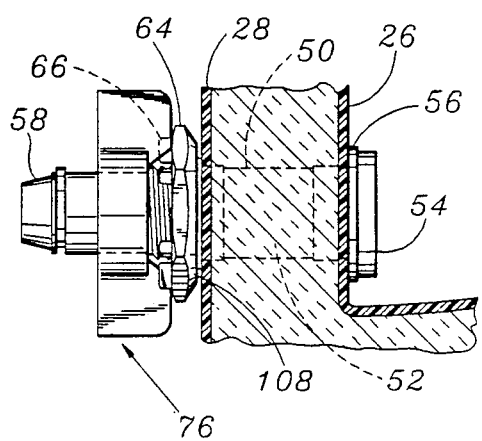
FIG. 2 shows a sectional view of the assembled spigot employed within the side wall of the beverage dispenser as it passes therethrough without the faucet connected thereto.

In particular, spigot 52 which is passed through the opening 50 has a rear flange 54 as seen in FIG. 2. The rear flange 54 secures the spigot 52 against the interior surface of wall 26 at an area adjacent the opening 50. This rear flange 54 allows the spigot 52 to be seated thereagainst while at the same time receiving a rubber seal 56. The rubber seal 56 seats the flange 54 of the spigot 50 against the wall 26, thereby preventing liquid flow through the opening 50.

The spigot 52 has a tapered frontal area which can be seen as tapered end 58. The tapered end 58 is in the frontal portion of the spigot 52 and is adapted for seating within a faucet 60.

The faucet 60 has an interior silicone cup seal not shown. The seal interiorly provided by the silicon cup seats against a seat base under a spring pressure. The cup seal is displaced by means of a handle 62 that can raise and lift a pin attached thereto to remove the cup seal. A knurled cap 61 is shown which can be interiorly threaded to provide access to the interior of the faucet.

In order to secure the spigot 52 to the wall with the rear backing flange 54 and seal 56, a hex nut or other suitable securement nut 64 has been used. In particular, a hex nut 64 has been shown with hexagonal surfaces although other shapes can be used as well including amoung others round, triangular, square and the like.

Figure 4:
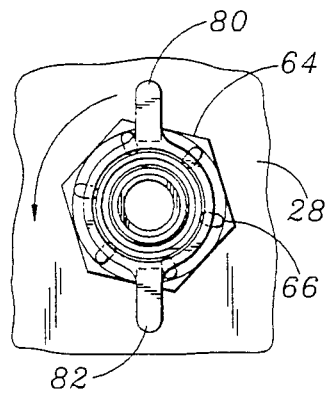
FIG. 4 shows a frontal view of the winged connector as seen in the direction of lines 4—4 of FIG. 2.
Figure 6:
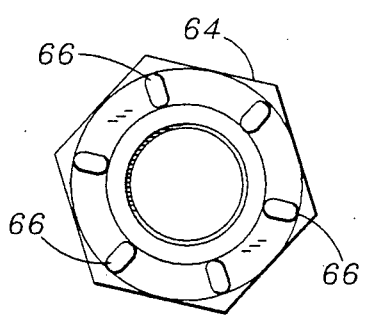
FIG. 6 shows a plan view of the securement hex nut with the protuberances that secure the spigot into the side wall of the container.

Looking more particularly at the hex nut 64 both in FIG. 1 and the other FIGS. 2, 4 and 6, it can be seen wherein the hex nut 64 has a relieved surface in the form of six nibs 66 around the outer surface thereof. The six nibs or protuberances 66 allow engagement by a key member as will be described hereinafter. It should be understood that while 6 nibs are shown fewer or greater numbers of nibs can be utilized. At least one nib is required but at least two are preferred.

Figure 3:
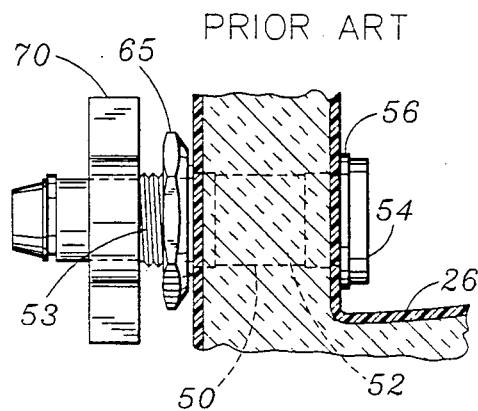
FIG. 3 shows a prior art spigot assembly in a similar view to that of FIG. 2.

Looking more particularly at the prior art showing in FIG. 3, it can be seen wherein a prior art hex nut 65 has been shown which does not incorporate nibs or protuberances as does the instant invention. Additionally, it can be seen within the prior art that a connecting nut or threaded connector 70 has been shown. The threaded connector 70 is shown as a connector which can be turned for securing the faucet to the spigot. This is done by means of internal threads of the threaded connector 70 that connect to the outer threads of the faucet.

When the utilization of prior art spigots and connectors were utilized, a substantial drawback was the difficulty in uncoupling the spigot 52 from the walls and the opening 50 therebetween. In order to make the disassembly, some means had to be used in order to turn the connector 70 on the threads of the faucet 60. This was accomplished by various means and was deemed to be impractical oftentimes.

An additional drawback was the removal of the hex nut 65 from the threads of the spigot. As can be seen, the spigot 52 has exterior threads 53 which receive the interior threads of the hex nut 64. The hex nut 65 of the prior art was turned down upon the threads 53 by means of a wrench and thereafter was disengaged by means of a wrench.

Oftentimes, the kitchen crew did not have a wrench readily available. Moreover, even with a wrench it was difficult to disassemble the hex nut by threading off of the threads 53 of the spigot 52 due to the emplacement of the spigot 52 and faucet 60 within a depression on the container wall.

This invention overcomes the deficiencies of the prior art by providing a built-in integral turning means for disengaging the hex nut 65 of the prior art. This is provided by the hex nut 64 with the protuberances 66 in combination with the extended wings 80 and 82 of the winged connector 76.

Figure 5:
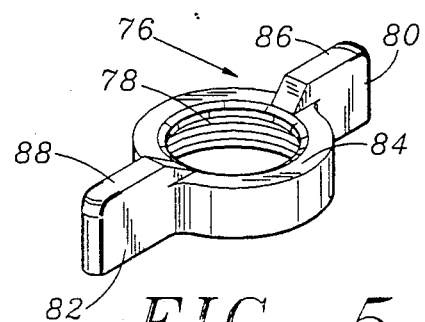
FIG. 5 shows a perspective view of the winged connector that interconnects the spigot to the faucet.

Looking more particularly at FIGS. 1, 4 and 5, it can be seen wherein the threaded connector between the spigot 52 and the faucet 60 has been shown in the form of a winged connector nut 76. The winged connector nut 76 has interior threads 78, and wings 80 and 82 which extend beyond the surface 84 surrounding the threads 78.

The wings 80 and 82 of the winged connector 76 extend upwardly to form respective radial engagement members 86 and 88. The radial engagement members 86 and 88 serve to engage the nibs or protuberances 66 in the hex nut 64. These winged radial engagement members 86 and 88 by engaging the nibs or protuberances 66 enable the hex nut 64 to be turned from the threads 53 of the spigot. In this manner, the hex nut 64 is disengaged from the spigot 52 without the means of an ancillary or superfluous wrench.

While the winged connector 76 is shown with two wings 80 and 82, it should be understood that only one wing is required and more than two wings can be employed if desired. As a practical matter, two wings are preferred.

As shown in FIGS. 1 and 2, the winged connection nut 76 is slipped over the tapered end 58 of the spigot 52 and is held in place by means of a retainer clip 92. The retainer clip 92 is preferably a stainless steel spring retainer clip such as a C-shaped clip which can override and engage by spring engagement a groove 57 in the spigot end 58. This prevents the winged connector 76 from being displaced from the end of the spigot 52. By preventing the disengagement of the spigot 52 from the winged connector 76, it is retained thereon and prevented from being disassembled and lost.

The winged connector nut 76 has interior threads 78 that are received on external threads 102 of the faucet 60. This retention of the connector nut 76 on the threads 102 causes the spigot 52 to be fluidly connected to the faucet 60 for dispensing of beverages through the mouth or opening of the faucet 60. Thus, the winged connector nut 76 which is secured to the end of the spigot 52 performs a dual function: connection of the spigot 52 to the faucet 60 and as a key for engagement for rotational movement of securement hex nut 64 on spigot 52.

In order to secure the hex nut 64 against the outer wall 28 of the container 10 at the opening 50, a fiber washer 108 is preferably utilized. The fiber washer 108 is preferably made of bakelite. It can be seen in greater detail in FIGS. 1 and 2 as fiber washer 108 which serves to back the hex nut 64 against the outer wall 28.

In order to assemble and disassemble the spigot 52 with respect to the faucet 60, it should be understood that the spigot is emplaced through the opening 50. When passing through the opening 50, the spigot 52 is backed by the rubber gasket seal 56 which secures the flange 54 against the surface of interior wall 26.

After emplacement in opening 50 of walls 26 and 28, the tapered end 58 of spigot 52 receives firstly the fiber washer 108 and then the hex nut 64 with the protuberances 66.

The winged connector 76 with the interior threads can be seated over the end 58 of the spigot 50 so that the winged engagement surfaces 86 and 88 are directed for turning against the nibs or protuberances 66 of the hex nut 64. This allows the winged connector 76 to turn the hex nut 64 downwardly on the threads 53 of the spigot 52. This tightens the hex nut 64 against the fiber washer 108 and thus against the outer wall 28 thereby securing the spigot 52 within the opening 50.

After securing the hex nut 64, the winged connector 76 can then be rotated such that its threads 78 interlock with the threads 102 of the faucet 60 for securing and tightening the winged connector 76 on the tapered end 58 of the spigot 52. To prevent removal of the winged connector 76 from the spigot 52 so that an appropriate seal is provided and to allow the interior surface to turn against a member for engagement of the respective threads 78 and 102, the retainer clip 92 is utilized.

In operation the retainer clip 92 which is seated in groove 57 at the end 58 of spigot 52 engages an interior flange of the winged connector 76 which extends interiorly beyond the threads 78 so that it turns against the clip 92. The net result is that the tapered end 58 of the spigot 52 is secured to and within the faucet 60.

When disassembly is contemplated, the faucet 60 is first disengaged from the spigot 52 by unthreading of the winged connector 76 from the faucet threads 102. Thereafter, the threaded winged connector 76 can be utilized as a key to unthread the hex nut 64 off of the exterior threads 53 of the spigot 52. This is done by turning the winged connector 76 in a counterclockwise direction as seen in FIG. 4. This action causes the engagement surface 86 and 88 of the winged connector 76 to engage the protuberances or nibs 66 of the hex nut 64 thereby causing the hex nut 64 to back off of the threads 53. This permits removal of the spigot 52 from the opening 50. The separated parts can then be cleaned in any convenient manner and then replaced as described.

From the foregoing, it can be seen that this invention incorporates in combination a winged connector and a hex nut with protuberances for a faucet and spigot. The spigot employs a hex nut with protuberances or nibs for securing it into the side wall of a beverage dispenser. The hex nut can be threaded or unthreaded from the spigot by the engagement by the extended wings of the winged connector of the nibs of the hex nut thereby turning against the hex nut. The hex nut is thereby threaded or unthreaded from the spigot without the need for an ancillary tool, wrench, or other means. Consequently, this invention should be read broadly as providing an integral built-in wrench or turning means within a beverage dispenser for removal of a faucet from a spigot in light hereof.

Various modifications of the invention are contemplated which will be obvious to those skilled in the art and which may be resorted to without departing from the spirit and scope of the invention as enunciated in the following claims.

I claim:

1. A spigot in removable combination with a faucet for externally dispensing beverages from within a walled container comprising:
    said spigot for passing through an opening of said walled container, said spigot having threads;
    spigot securement means having threads for interconnecting with said threads of said spigot and to secure said spigot onto said walled container;
    said spigot securement means having exterior engagement means for interengaging engagement means on a connector means whereby said connector means can rotate said spigot securement means on said spigot threads;
    said faucet mounted for removable connection to said spigot; and,
    said connector means adapted both for removable attachment to said spigot and for removable attachment to said faucet, and used for removable connection of said spigot onto said container by gripping said engagement means on said securement means with said connector means engagement means for rotation of said securement means around said spigot.

2. The combination as claimed in claim 1 wherein:
    said fauet has threads;
    said connector means is formed as a threaded member for threadedly engaging said faucet threads; and,
    said engagement means on said connector means for interengaging said engagement means of said threaded spigot securement means provides a surface area for turning said connector means onto and off of said threads of said faucet.

3. The combination as claimed in claim 2 wherein:
    said connector means has interior threads and said faucet has exterior threads for receiving the threads of said connector means in a tightened relationship for removable attachment of said faucet onto said spigot.

4. The combination as claimed in claim 2 wherein:
    said engagement means of said connector means has at least one extension therefrom; and,
    said spigot securement engagement means has means for receiving said extension.

5. The combination as claimed in claim 4 wherein:
    said engagement means of said connector means comprises at least one winged extension; and,
    said spigot securement means comprises a nut having a relieved surface thereon for receiving said winged extension.

6. The combination as claimed in claim 5 wherein:
    said relieved surface of said nut comprises at least one protuberance for receiving said winged extension the remainder of said surface forming said relieved surface.

7. The combination as claimed in claim 6 wherein:
    said connector means comprises a winged nut member for securing said faucet to said spigot and said spigot securement means comprises a nut having one or more protuberances extending around the surface thereof for receiving one or more of the winged extension of said connector means for rotationally tightening or loosening said nut on said spigot threads.

8. The combination as claimed in claim 7 further comprising:
    a flange on said spigot for receipt against the interior wall of the beverage container; and,
    means for securing said connector means on the end of said spigot.

9. An apparatus for engaging and disengaging a spigot from a beverage container with a hole in a wall thereof for mounting said spigot, and for coupling and uncoupling a faucet from said spigot, said spigot having a flange at one end for receipt within said hole of said beverage container and threads distal therefrom which are at least in part on the outside of said beverage container when said spigot is mounted in said hole, and, said faucet is connected to the end of said spigot, comprising:
    a securement nut for threading over the threads of said spigot on the external portion thereof; and,
    a connecting member for connecting said spigot to said faucet and including means to attach to both the spigot and faucet, said connecting member having engagement means thereon which transmits torque to said securement nut for tightening said securement nut on said spigot threads and provides a surface area for turning said connecting member and thereby securing it to said faucet via said means to attach.

10. The improvement as claimed in claim 9 wherein:
    said securement nut has a relieved surface thereon; and,
    said connecting member engagement means has means for engaging said relieved surface of said nut.

11. The improvement as claimed in claim 10 further comprising:
    said securement nut for receipt on the threads of said spigot having one or more protuberances extending from the surface thereof, the remainder of said surface forming said relieved surface; and wherein,
    said engagement means on said threaded connecting member comprises at least one extension therefrom for engaging said protuberances on said securement nut and turning said securement nut on the threads of said spigot and to provide a surface area for turning said connecting member and securing it to said faucet.

12. The improvement as claimed in claim 11 wherein:
    said connecting member has threads which engage said faucet and secure it on said spigot; and wherein,
    said engagement means on said threaded connecting member comprises at least one winged extension on said connecting member having a surface which is capable of engaging said protuberances of said securement nut for turning said securement nut on said spigot and to provide a surface area for turning said connecting member and securing it to said faucet.

13. The improvement as claimed in claim 12 wherein:
    said threaded connecting member has a pair of wings thereon with raised surfaces which engage said protuberances of said securement nut.

14. The combination of a beverage dispenser having a beverage chamber therein and a removable faucet with a removable spigot attached thereto comprising:
    a walled beverage dispenser having one or more walls;
    an opening passing through said walls;
    a spigot for receipt within said opening having an interior portion for seating within the interior of said beverage container and an exterior portion having threads for extension externally of said walls;

a faucet for attachment to the exterior portion of said spigot;

an interiorly threaded securement member for threading on the threads of said spigot to secure said spigot within the opening of said wall of said beverage container;

a relieved surface on said securement member;

connecting means for connecting said faucet to said spigot and having key means providing a dual function for engaging said relieved surface of said securement member for threading said securement member onto and off of said spigot and for gripping for attaching and disattaching said faucet onto and off of said spigot.

15. The combination as claimed in claim 14 wherein said connecting means for engaging said securement member comprises:

a connecting member having threads for receipt on said faucet to secure said faucet on said spigot and having at least one extension therefrom providing a dual function for being received on the relieved surface of said securement member to move said securement member by rotational movement to tighten or loosen said securement member on said spigot and for providing a gripping area for threading said connecting member onto and off of said faucet.

16. The combination as claimed in claim 15 wherein: said container has been formed from a rotationally molded high density polyurethane.

17. The combination as claimed in claim 15 wherein: said container has been formed with inner and outer plastic side walls and having a polyurethane foam therebetween for insulation purposes.

18. The combination as claimed in claim 15 wherein: said securement member has at least one protuberance on the surface thereof, the remainder of said surface forming said relieved surface.

19. The combination as claimed in claim 18 wherein: said dual function extension on said connecting member for securing said faucet on said spigot comprises at least one wing extending therefrom having a surface for engaging at least one said protuberance of said securement member.

20. The combination as claimed in claim 19 wherein: said at least one protuberance comprise at least one nib on the surface of said securement member.

21. The combination as claimed in claim 20 wherein: said dual function extension which comprises a wing therefore on said connecting member comprises a pair of wings extending therefrom with surfaces for engaging the at least one nib of said engagement member and for gripping for threading said connecting member onto and off of said faucet.

22. The combination as claimed in claim 21 further comprising:

said interior portion comprising a flange adapted for securing said spigot interiorly of said beverage container;

a groove on said spigot external from said container;

spring clip means for detachable securement of said connecting member, said clip received within said groove acting as a backup clip against which said connecting member can bear against; and, seal means for sealing said spigot to the walls of said container.

* * * * *